United States Patent
Amanullah et al.

(10) Patent No.: US 9,834,718 B2
(45) Date of Patent: Dec. 5, 2017

(54) ECOFRIENDLY LUBRICATING ADDITIVES FOR WATER-BASED WELLBORE DRILLING FLUIDS

(71) Applicant: Saudi Arabian Oil Company, Dhahran (SA)

(72) Inventors: Md Amanullah, Dhahran (SA); Abdulaziz S. Bubshait, Dhahran (SA); Omar A. Fuwaires, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/270,815

(22) Filed: May 6, 2014

(65) Prior Publication Data

US 2015/0322325 A1    Nov. 12, 2015

(51) Int. Cl.
| | |
|---|---|
| *E21B 7/00* | (2006.01) |
| *C09K 8/16* | (2006.01) |
| *E21B 21/06* | (2006.01) |
| *C09K 8/18* | (2006.01) |
| *C09K 8/035* | (2006.01) |
| *C11C 3/00* | (2006.01) |
| *C10M 129/70* | (2006.01) |

(52) U.S. Cl.
CPC ............ *C09K 8/16* (2013.01); *C09K 8/035* (2013.01); *C09K 8/18* (2013.01); *C10M 129/70* (2013.01); *C11C 3/003* (2013.01); *E21B 7/00* (2013.01); *E21B 21/068* (2013.01); *C09K 2208/34* (2013.01); *C10M 2207/281* (2013.01); *C10M 2207/283* (2013.01); *C10M 2207/40* (2013.01); *C10N 2230/06* (2013.01); *C10N 2270/00* (2013.01)

(58) Field of Classification Search
USPC ................................. 166/305.1, 259; 175/65
See application file for complete search history.

(56) References Cited

U.S. PATENT DOCUMENTS

| | | |
|---|---|---|
| 3,761,410 A | 9/1973 | Mondshine et al. |
| 4,063,603 A | 12/1977 | Rayborn |
| 4,181,617 A | 1/1980 | Elrod et al. |

(Continued)

FOREIGN PATENT DOCUMENTS

| | | |
|---|---|---|
| CN | 101157850 | 4/2008 |
| EP | 0324887 | 7/1989 |

(Continued)

OTHER PUBLICATIONS

Amanullah, "Environment Friendly Base Fluid to Replace the Toxic Mineral Oil-Based Base Fluids", U.S. Appl. No. 13/965,406, 30 pages.

(Continued)

*Primary Examiner* — Silvana Runyan
(74) *Attorney, Agent, or Firm* — Fish & Richardson P.C.

(57) ABSTRACT

Some examples of producing water-based drilling fluids including ecofriendly lubricating additives are described. A raw material oil including fatty acids with a short chain alcohol is esterified in the presence of a catalyst to produce alkyl ester products and triglycerides. The alkyl ester products are washed and heated to remove any residual water or the short chain alcohol. A first quantity of the alkyl ester products is mixed with a second quantity of a water-based wellbore drilling fluid.

12 Claims, 5 Drawing Sheets

(56) References Cited

U.S. PATENT DOCUMENTS

| | | |
|---|---|---|
| 4,280,915 A | 7/1981 | Kercheville |
| 4,783,274 A | 11/1988 | Jokinen et al. |
| 4,802,998 A * | 2/1989 | Mueller et al. ............... 507/134 |
| 5,338,471 A | 8/1994 | Lal |
| 5,525,126 A | 6/1996 | Basu et al. |
| 5,587,354 A | 12/1996 | Duncan, Jr. |
| 5,703,022 A | 12/1997 | Floyd |
| 5,713,965 A | 2/1998 | Foglia et al. |
| 5,747,434 A | 5/1998 | Lamsa et al. |
| 5,885,946 A | 3/1999 | Lamsa |
| 6,127,560 A | 10/2000 | Stidham et al. |
| 6,887,283 B1 | 5/2005 | Ginosar et al. |
| 7,524,798 B2 | 4/2009 | Kunz et al. |
| 8,563,482 B2 | 10/2013 | Amanullah |
| 2004/0082483 A1 | 4/2004 | Muller et al. |
| 2005/0204612 A1 | 9/2005 | Connemann et al. |
| 2005/0221994 A1 * | 10/2005 | Xiang .................... C09K 8/145 507/140 |
| 2006/0293533 A1 * | 12/2006 | Iyer .............................. 554/174 |
| 2007/0287636 A1 | 12/2007 | Heller et al. |
| 2008/0318812 A1 | 12/2008 | Kakadjian, Sr. et al. |
| 2009/0054284 A1 | 2/2009 | Sunkara |
| 2009/0075847 A1 | 3/2009 | Wawrzos et al. |
| 2009/0131711 A1 | 5/2009 | Wanasundara |
| 2009/0140830 A1 | 6/2009 | Amanullah et al. |
| 2010/0000795 A1 | 1/2010 | Kakadjian et al. |
| 2010/0298176 A1 | 11/2010 | Maker et al. |
| 2012/0071369 A1 | 3/2012 | Amanullah |
| 2014/0309146 A1 * | 10/2014 | D'Elia et al. ................. 507/129 |

FOREIGN PATENT DOCUMENTS

| | | |
|---|---|---|
| EP | 0374671 | 6/1990 |
| EP | 1206437 | 5/2002 |
| FR | 2781498 | 1/2000 |
| IN | 200400391 | 4/2009 |
| RO | 0126123 | 3/2011 |
| RU | 2055089 | 2/1996 |
| WO | WO9640835 | 12/1996 |
| WO | WO2008011731 | 1/2008 |
| WO | WO2012039912 | 3/2012 |

OTHER PUBLICATIONS

PCT International Search Report, PCT Application No. PCT/US2011/050288, Dec. 13, 2011, 14 pages.

International Search Report issued in International Application No. PCT/US2015/029374 dated Jul. 9, 2015; 11 pages.

* cited by examiner

ECOFRIENDLY LUBRICATING ADDITIVES FOR WATER-BASED WELLBORE DRILLING FLUIDS

TECHNICAL FIELD

This disclosure relates to an ecofriendly lubricating additive for wellbore drilling systems through which wellbore drilling fluids are flowed.

BACKGROUND

Wellbore drilling operations use wellbore drilling fluids for multiple purposes including, e.g., to cool the drill bit, to transport wellbore cuttings from inside the wellbore to the surface, or other purposes. Drilling fluids are also used to reduce friction between the drill string and the casing and/or the wellbore wall by acting as a lubricating medium for the drill string while drilling the wellbore. Drilling fluids can be divided into categories, e.g., oil-based drilling fluids, water-based drilling fluids, or other categories. Sometimes, additives are added into either or both categories of drilling fluids to enhance the properties of the drilling fluids including the properties to reduce friction.

SUMMARY

This disclosure describes lubricating additives for water-based wellbore drilling fluids.

Certain aspects of the subject matter described here can be implemented as a method for producing water-based wellbore drilling fluids. A raw material oil including fatty acids with a short chain alcohol is esterified in the presence of a catalyst to produce alkyl ester products and triglycerides. The alkyl ester products are washed and heated to remove any residual water or the short chain alcohol. A first quantity of the alkyl ester products is mixed with a second quantity of a water-based wellbore drilling fluid.

This, and other aspects, can include one or more of the following features. The first quantity can be substantially between 1.5% and 3.4% by volume of a sum of the first quantity and the second quantity. The first quantity can be substantially between 6 cc and 12 cc, and the second quantity can be 350 cc. The alkyl ester products and the triglycerides can be separated before washing the alkyl ester products. Impurities can be removed from the raw material oil prior to esterifying the raw material oil. Removing the impurities from the raw material oil can include filtering the raw material oil at a pressure ranging substantially between 5 psi and 10 psi. The raw material oil can include processed vegetable oil. The fatty acids can include molecules averaging substantially from 16 carbon atoms to less than 20 carbon atoms. The short chain alcohol can include at least one or more of methanol, ethanol, propanol, or butanol. A plastic viscosity of the raw material oil can be greater than substantially 50 cP. The catalyst can include at least one of sodium hydroxide, potassium hydroxide, sodium alkoxides, or potassium alkoxides.

Certain aspects of the subject matter described here can be implemented as a wellbore drilling fluid mixture including a first quantity of a water-based wellbore drilling fluid and a second quantity of washed and heated alkyl ester products substantially free of residual water or short chain alcohol included in esterified raw material oil. The second quantity is mixed with the first quantity.

This, and other aspects, can include one or more of the following features. The second quantity of washed and heated alkyl ester products can be void of triglycerides in the esterified raw material oil. The raw material oil can include processed vegetable oil. The raw material oil can include fatty acid molecules averaging substantially from 16 carbon atoms to less than 20 carbon atoms. The raw material oil can have a plastic viscosity of greater than substantially 50 cP. The second quantity can be substantially between 1.5% and 3.4% by volume of a sum of the first quantity and the second quantity. The second quantity can be substantially between 6 cc and 12 cc, and the first quantity can be 350 cc.

Certain aspects of the subject matter described here can be implemented as a method of using a water-based wellbore drilling fluid. A wellbore drilling fluid mixture is formed by mixing a first quantity of a water-based wellbore drilling fluid and a second quantity of washed and heated alkyl ester products substantially free of residual water or short chain alcohol included in esterified raw material oil, the second quantity mixed with the first quantity. The wellbore drilling fluid mixture is flowed through a wellbore while drilling the wellbore.

This, and other aspects, can include one or more of the following features. The second quantity can be substantially between 1.5% and 3.4% by volume of the wellbore drilling fluid mixture. The washed and heated alkyl ester products can be produced by removing impurities from the raw material oil comprising fatty acids, esterifying the raw material oil with a short chain alcohol in the presence of a catalyst to produce the alkyl ester products and triglycerides, separating the alkyl ester products and the triglycerides, washing the alkyl ester products, and heating the alkyl ester products to remove any residual water or the short chain alcohol.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
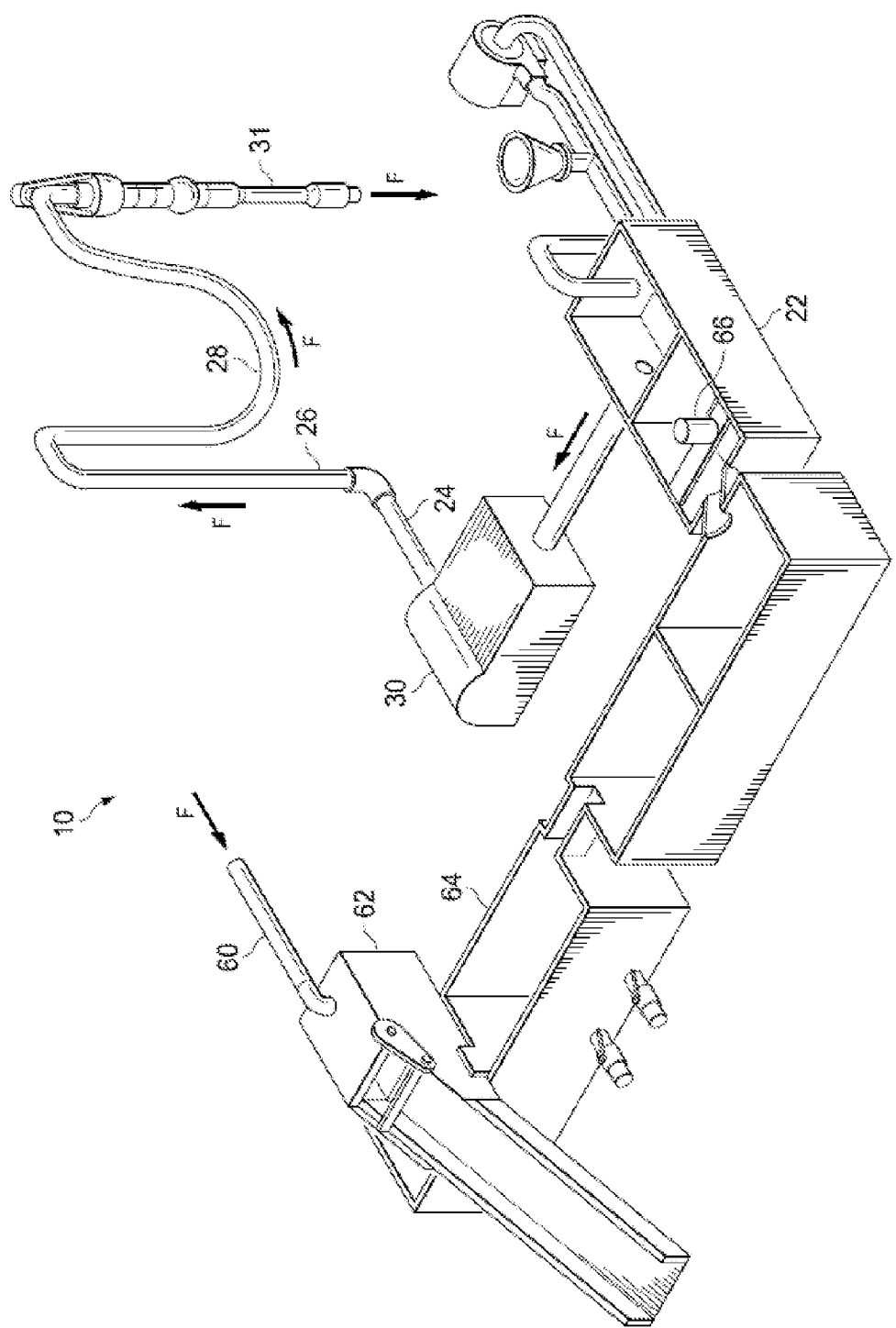
FIG. 1 is a schematic diagram of a drilling fluid circulation system.
Figure 2:
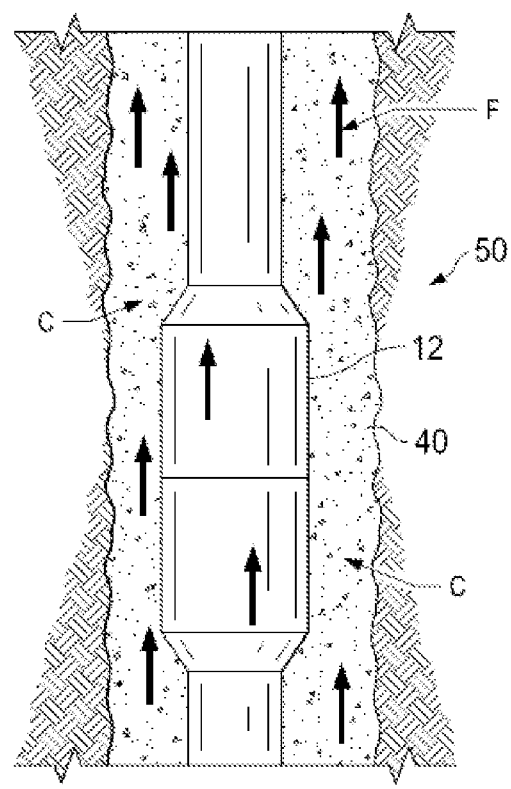
FIG. 2 is a schematic diagram showing drilling fluid flowing through a drill string and an annulus between the drill string and a wellbore.

This disclosure describes additives for water-based wellbore drilling fluids. The additives are ecofriendly lubricants derived from waste vegetable oil produced by the food industry, and can serve as an environmental alternative to mineral and/or diesel oil-based lubricants. FIG. 1 is a schematic diagram of a drilling fluid circulation system 10. FIG. 2 is a schematic diagram showing drilling fluid flowing through a drill string 12 and an annulus 40 between the drill string 12 and a wellbore 50. In wellbore drilling situations that use a drilling rig, a drilling fluid circulation system 10 circulates (or pumps) drilling fluid (e.g., drilling mud) with one or more mud pumps. The drilling fluid circulation system 10 moves drilling fluid (mud, F) down into the wellbore 50 through a drill string 12, and drill collars which are connected to the drill string 12. The drilling fluid exits through ports (Jets) in the drill bit, picking up cuttings C and carrying the cuttings of the annulus 40 of the wellbore 50. The mud pump 30 takes suction from mud tank 22 and pumps the drilling fluid F out discharge piping 24, up with the standpipe 26, through rotary hoses 28, through Kelly or top drive unit 31, and into a central bore of the drill string 12, drill collars and drill bit. Drilling fluid F and cuttings C are returned to the surface of the annulus 40. At the surface, the drilling fluid and cuttings leave the wellbore 50 through an outlet (not shown) and are sent to a cuttings removal system via mud return line 60. At the end of the return lines, drilling fluid F and cuttings C are flowed onto a vibrating screen, e.g., a shale shaker 62. Finer solids can be removed using a sand trap 64. The drilling fluid can be treated with chemicals stored in a chemical tank 66 and then provided into the mud tank 22, wherein the process can be repeated.

The drilling fluid circulation system 10 delivers large volumes of drilling fluid under pressure for the drilling rig operations. The circulation system 10 delivers the drilling fluid to the drill stem to flow down the drill string 12 and out through the drill bit appended to the lower end of the drill stem. In addition to cooling the drill bit, the drilling fluid hydraulically washes away debris, rock chips, and cuttings, which are generated as the drill bit advances into the wellbore 50. Thus, the drilling fluid is an important part of the component drilling operation which can be flowed through wellbore drilling system components, e.g., as rotary, coiled tubing, casing, or other components, in different wellbore drilling operations, e.g., under balance drilling, overbalanced drilling, or other drilling operations, to perform several functional tasks and facilitate safe, trouble-free and economical drilling.

Wellbore drilling fluids can be categorized as oil-based drilling fluids or water-based drilling fluids. Sometimes, the coefficient of friction (COF) of water-based drilling fluids can be less than the corresponding COF of oil-based drilling fluids or synthetic oil-based drilling fluids. High COF can cause issues, e.g., a reduction in the rate of penetration (ROP), increase in equipment wear, pipe twisting, or other issues, while drilling. High COF can also limit the reach of horizontal or extended reach wells, thereby posing a barrier for such drilling operations. Increase the friction between the drill string and the internal wall of the wellbore can provide resistance to drill string motion resulting in a reduction in ROP and drilling efficiency.

Drilling fluids with low COF values are beneficial for drilling operations, e.g., drilling operations to drill horizontal and/or extended reach wells. To improve the COF and, consequently, decrease frictional resistance of water-based drilling fluids, additives, e.g., lubricating additives, can be used in the formulation of the water-based drilling fluids. Such additives can, alternatively or in addition, decrease torque and drag issues associated with the water-based drilling fluids. Examples of such additives include diesel oil, mineral oil, synthetic oil, detergents, bentonite clays, alcohols, gilsonite, asphaltic materials, cellulosic materials, dextrose, glycerin, amines, to name a few. Certain lubricating additives are poorly biodegradable or highly toxic (or both). Certain lubricating additives have limited capacity to reduce the COF of the drilling fluid and to enhance the drilling fluid performance during wellbore drilling. Certain lubricating additives have poorer thermal and chemical stability in the harsh wellbore drilling environments. Moreover, environmental laws and regulations can restrict the permission to use certain lubricating additives in water-based drilling fluids due to threats to certain environments, e.g., offshore drilling environment, deep water drilling environment, or other environments.

This disclosure describes an eco-friendly and high-performance lubricating additive for water-based drilling fluid that can enhance the lubrication properties and reduce the COF of the water-based drilling fluid. As described below, the additive is prepared by processing and treating waste vegetable oil that is a byproduct of the food industry. The resulting additive can decrease the COF of water-based drilling fluids. Implementing the additive during wellbore drilling can decrease torque or drag problems (or both) during drilling operations or tripping operations. In turn, ROP and overall drilling efficiency can increase. Reduction of the COF can extend the reach of horizontal or extended reach wells (or both). The additive is eco-friendly and, consequently, does not compromise the environmental attributes of onshore or offshore drilling environments. As described below, the additive is produced by esterification of waste vegetable oil which is a byproduct of the food industry. Thus, the base material for producing the additive can be obtained cheaply. In addition, recycling the waste vegetable oil can facilitate disposal and cost of disposal of the waste generated by the food industry. Recycling of the waste vegetable oil can decrease or eliminate the industrial use of edible oil and, consequently have little to no adverse effect on the consumer market. Use of recycled waste vegetable oil in the oil field can create new enterprises, local industrial growth, employment opportunities and improved socio-economic conditions of local people, thereby contributing to local and national economy.

Figure 3:
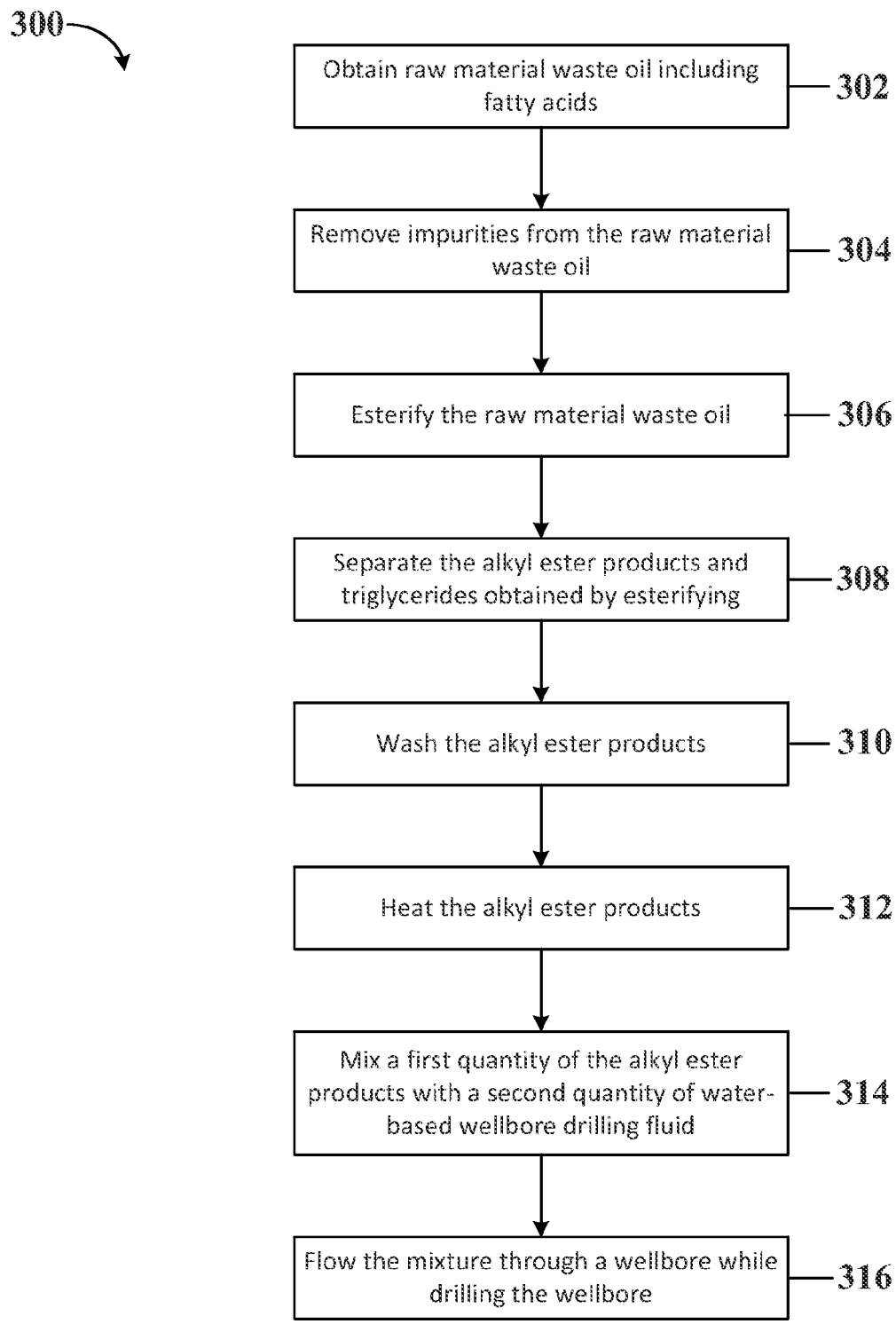
FIG. 3 is a flowchart of an example process of producing a water-based drilling fluid including an additive.

FIG. 3 is a flowchart of an example process 300 of producing a water-based drilling fluid including an additive. In some implementations, the additive can be used in other wellbore fluids, e.g., fracturing fluids, completion fluids, stimulation fluids, combinations of them, or other wellbore fluids. At 302, the raw material oil including fatty acids is obtained. In some implementations, the raw material oil can be processed vegetable oil produced as a byproduct by the food industry. Alternatively, the raw material oil can be pure vegetable oil or other type of oil.

The raw material oil can have a plastic viscosity of greater than substantially 50 cP or 60.8 cP measured using a multi-speed rotational viscometer. The raw material oil can have a plastic viscosity ratio of raw material oil to mineral oil that is greater than substantially 10 (e.g., substantially 11.18). The raw material oil can have a plastic viscosity ratio of more than substantially 20 with respect to the plastic viscosity of a highly refined oil produced by Safra (Jeddah, Saudi Arabia) and used for offshore drilling. The raw material oil can have a plastic viscosity ratio of substantially 24.12 with respect to the highly refined oil produced by Safra and used for offshore drilling. The raw material oil can have a plastic viscosity ratio of more than substantially 10 with respect to the plastic viscosity of mineral oils that are used for oil-based drilling fluid formulations. The raw material oil can have a plastic viscosity ratio of substantially 11.18 with respect to the plastic viscosity of mineral oils used for oil-based drilling fluid formulations.

The raw material oil can include fatty acids with a short chain alcohol. The short chain alcohol can include at least one or more of methanol, ethanol, propanol, butanol, or combinations of them. The fatty acids can include molecules averaging substantially from 16 carbon atoms to less than 20 carbon atoms.

At 304, impurities are removed from the raw material oil. The impurities, e.g., food residues, can reduce the functional capability of the raw material oil. In some implementations, the raw material oil can be filtered, e.g., quick filtered, at low pressure, e.g., a pressure range of substantially 5 PSI to substantially 10 PSI. Impurities can be removed from the raw material oil using alternative or additional methods.

At 306, the raw material waste oil is esterified. In some implementations, the raw material waste oil is esterified in the presence of a catalyst to produce alkyl ester products and triglycerides. The catalyst can include at least one of sodium hydroxide, potassium hydroxide, sodium alkoxide, potassium alkoxide, or combinations of them. For example, the raw material oil can be esterified with methanol in the presence of sodium hydroxide.

At 308, the alkyl ester products and triglycerides are separated. At 310, the alkyl ester products are washed, and, at 312 heated to remove any residual water or the short chain alcohol. Implementing the afore-described steps of process 300 produces washed and heated alkyl ester products that are substantially (in some instances, entirely) free of residual water or short chain alcohol included in esterified raw material oil. The washed and heated alkyl ester products are void of triglycerides in the esterified raw material oil.

At 314, a first quantity of the alkyl ester products is mixed with a second quantity of water-based wellbore drilling fluid. In some implementations, the first quantity is substantially between 1.5% and 3.4% by volume of a mixture consisting of the first quantity of the alkyl ester products and the second quantity of the water-based wellbore drilling fluid. For example, the first quantity is substantially between 6 cc and 12 cc, and the second quantity is 350 cc (equivalent to one barrel of water-based drilling fluid). In some implementations, less than 3% of the mixture consists of the additive and more than 97% of the mixture consists of the water-based drilling fluid.

At 316, the mixture is flowed through the wellbore while drilling the wellbore. As described above, the wellbore drilling fluid mixture is formed by mixing a quantity of the water-based wellbore drilling fluid and a quantity of the washed and heated alkyl ester products substantially free of residual water or short chain alcohol included in esterified raw material waste oil, the second quantity mixed with the first quantity. The wellbore drilling fluid mixture is flowed through the wellbore while drilling the wellbore.

Example techniques for implementing portions of process 300 to produce the additive are described below. Alternative techniques can be implemented to produce the additive.

Removal of Impurities and Excess Water

Waste vegetable oil was used as the raw material oil. A low pressure filtration cell was used to remove impurities, e.g., burnt and unburned food residue, which was present in the waste vegetable oil. The low pressure filtration cell included filter paper that had or sizes that were less than 5 µm to remove impurities that were larger than 5 µm. A constant pressure of 5-10 PSI was used on the low pressure cell for quick filtration of a volume of the waste vegetable oil. Other filtration media and/or adsorbents that are capable of removing all impurities and excess water from the waste vegetable oil can be used as alternatives or in addition to the low pressure filtration cell. For example, a multi-cell filtration apparatus can be used for removing the impurities.

Determination of Quantity of Catalyst

A quantity of catalyst that was required to process the waste vegetable oil was determined by titration method. To do so, 1 mL of waste vegetable oil was mixed with 10 mL of isopropyl alcohol of 99.2% purity. To this mixture, 2-3 drops of an indicator fluid (e.g., phenolphthalein, or other indicator fluid) was added. The indicator fluid was added drop by drop into the agitated waste vegetable oil until the color changed to pink. After the endpoint, the mixture was stirred for a while to check the permanency of the pink color. The titration test was repeated three times to calculate the average amount of catalyst required to reach the endpoint. After determining the average value of sodium hydroxide (NaOH) based on the titration test results, a constant value of 3.5 g was added to determine the total amount of catalyst (e.g., between 4.18 g and 4.22 g) required for 1 L of waste vegetable oil.

Esterification to Remove Triglycerides

The viscosity of the waste vegetable oil was reduced to match the mineral oil viscosity by esterifying the base oil using methanol. To do so, a volume of methanol, e.g., 20% original waste vegetable oil volume, and the mass of NaOH (e.g., 4.22 g NaOH/liter of waste vegetable oil) were mixed in a highly dry condition using a magnetic stirrer and then added to the waste vegetable oil in a container. The mixture was then stirred for six hours using the magnetic stirrer to complete the interactions.

Sedimentation

The total reaction product was allowed to stay in static conditions overnight to complete the sedimentation of glycerol and sludge at the bottom of the container. During the initial settling phase, if some emulsion were formed, e.g., due to the presence of some emulsion forming byproducts in the ester layer, the emulsion can be broken by heating the processed mass at about 80° C. or adding about 10 mL of acetic acid per liter of waste vegetable oil to break and prevent the emulsion formation.

Separation and Washing of Esterified Oil

After complete sedimentation, the top clear esterified oil was decanted slowly and washed for several hours using water while stirring with a magnetic stirrer. Then, the esterified oil and the washed water where kept in static condition overnight for effective separation of oil and water phases. The separated oil phase was decanted slowly to remove it from the water phase. The process of washing was repeated, e.g., twice.

Drying of Esterified Oil

After the final washing, the washed, esterified oil was heated to 80° C. under dynamic condition using a hot plate and a magnetic stirrer to remove water and methanol further from the processed vegetable oil resulting in the washed and heated alkyl ester products substantially free of residual water or short chain alcohol included in esterified raw material oil.

Figure 4A:
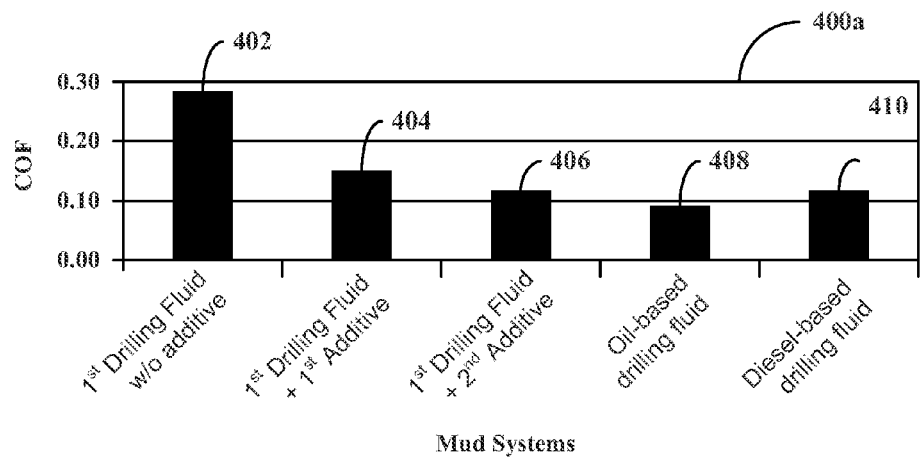
FIGS. 4A-4D are bar charts comparing lubricating properties of the water-based drilling fluid prepared using the process of FIG. 3 and lubricating properties of other drilling fluids.

FIGS. 4A-4D are bar charts comparing lubricating properties of the water-based drilling fluid prepared using the process of FIG. 3 and lubricating properties of other drilling fluids. Each bar chart compares the COF of different water-based drilling fluids with or without additives. In some implementations, the COF was measured between two metallic surfaces under the action of a normal load. FIG. 4A is a bar chart 400a comparing COFs of a quantity (e.g., 350 cc) of a first water-based drilling fluid mixed with a quantity (e.g., 7 cc) of first additive produced by implementing process 300, the first water-based drilling fluid with a second, different additive, an oil-based drilling fluid, and a diesel-based drilling fluid.

EXAMPLE 1

Comparing Lubricities of Different Wellbore Drilling Fluids

Three liters of the first water-based drilling fluid (SAVA™ mud) was prepared using a high speed mixture. 350 cc of the first water-based drilling fluid was mixed with 7 cc of the first additive produced by implementing process 300 for five minutes using a high speed mixer. A COF 404 of the first mixture was determined using a lubricity tester at least three times to get an average value. The test was repeated using 350 cc of the first water-based drilling fluid mixed with 7 cc of a second, mineral-based additive, and using 350 cc of the first water-based drilling fluid mixed with 7 cc of diesel oil. Both mixtures were mixed for five minutes; the COFs of the two mixtures were then measured using the lubricity tester.

As the bar chart 400a shows, the COF 402 of the first water-based drilling fluid without an additive is between 0.2 and 0.3. Adding the first additive to the first water-based drilling fluid reduces the COF 404 of the resulting first mixture to between 0.1 and 0.2. Adding the second additive (i.e., a mineral-based additive) to the first water-based drilling fluid reduces the COF 406 of the resulting second mixture to substantially 0.1, a decrease of nearly 40% compared to the COF of the first water-based drilling fluid without the first additive. Because the second additive is a mineral-based additive, the second mixture does not offer the ecological benefits of the first mixture. The COF 404 of the first mixture is comparable to the COF 408 of an oil-based drilling fluid and the COF 410 of a diesel-based drilling fluid. These results demonstrate that the eco-friendly first additive produced by implementing the process 300 can play a positive role in reducing the torque and drag problems, and in enhancing the ROP in the presence of water-based drilling fluids.

EXAMPLE 2

Comparing Lubricities of Different Quantities of the Additive

Figure 4B:
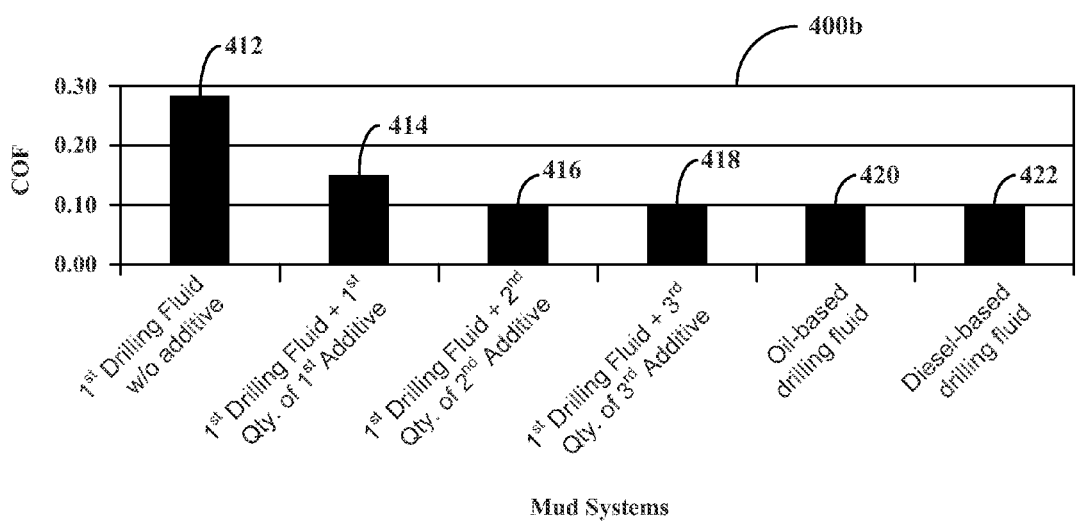

FIG. 4B is a bar chart 400b comparing COFs of the first water-based drilling fluid with different quantities of the first additive. Mixtures of a quantity of the first water-based drilling fluid (e.g., 350 cc) and the three different quantities (e.g., 7 cc, 10 cc, 15 cc) of the first additive were prepared. The COF 414 of the first mixture (i.e., 7 cc of the first additive with 350 cc of the first water-based drilling fluid) is between 0.1 and 0.2, which is less than the COF 412 of the first water-based drilling fluid without the first additive. Increasing the quantity of the first additive from 7 cc to 10 cc in the second mixture resulted in a decrease in the COF 416 of the second mixture below the COF 414 of the first mixture. Further increase in the quantity of the first additive from 10 cc to 15 cc did not significantly decrease the COF 418 of the resulting third mixture relative to the COF 416 of the second mixture. The COF 416 of the second mixture and the COF 418 of the third mixture were comparable to the COF 420 of an oil-based drilling fluid and the COF 422 of a diesel-based drilling fluid. The data in the bar chart 400b demonstrates that a quantity of the first additive in the range of 7 cc-10 cc mixed with substantially 350 cc of the water-based drilling fluid can provide lubricating potential to reduce the torque, drag, equipment wear, twist-off, and other lubrication-related wellbore drilling issues.

EXAMPLE 3

Comparing Lubricities of Different Wellbore Drilling Fluids

Three liters of a second water-based drilling fluid (LSND™) was prepared using a high speed mixture. 350cc of the second water-based drilling fluid was mixed with 7 cc of the first additive, and mixed for five minutes using a high speed mixer. Then, the lubricity coefficient of the mixture was measured using a lubricity tester. The test was repeated using 350 cc of the second water-based drilling fluid mixed with 7 cc of a first mineral oil, using 350 cc of the second water-based drilling fluid mixed with 7 cc of a second mineral oil (SAFRA™), and using 350 cc of the second water-based drilling fluid mixed with 7 cc of diesel oil. The COFs obtained by performing these experiments were compared with the COFs of oil-based wellbore drilling fluids and diesel-based wellbore drilling fluids.

Figure 4C:
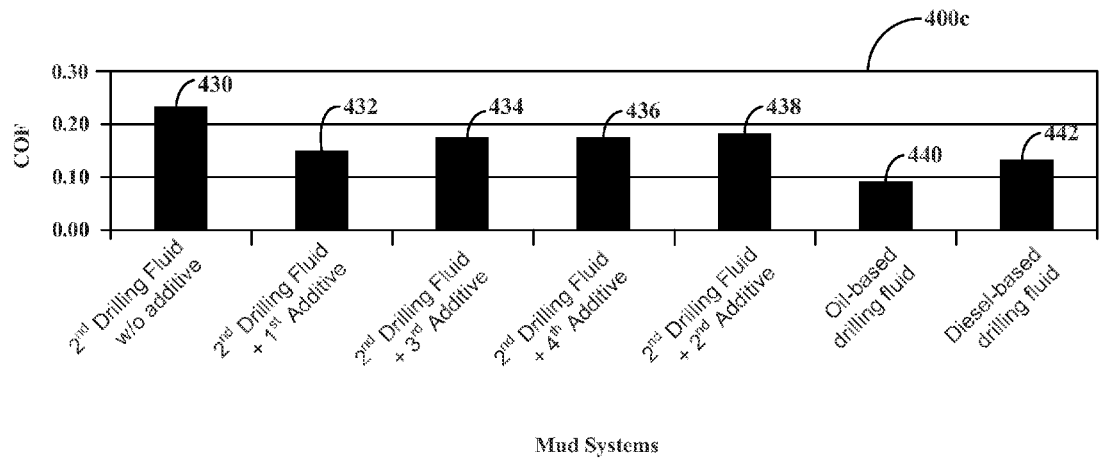

FIG. 4C is a bar chart 400c comparing COFs of the second water-based drilling fluid with different additives. As the bar chart 400c shows, the COF 430 of the second water-based drilling fluid without any additive is greater than 0.2. The COF 432 of the second water-based drilling fluid mixed with the first additive prepared by implementing the process 300 is between 0.1 and 0.2. The COF 434 of the second water-based drilling fluid mixed with diesel oil, the COF 436 of the second water-based drilling fluid mixed with the first mineral oil, and the COF 438 of the second water-based drilling fluid mixed with the second mineral oil (SAFRA™) are comparable to the COF 432 of the second water-based drilling fluid mixed with the first additive. The COF 440 of the oil-based drilling fluid and the COF 442 of the diesel-based drilling fluid are only marginally less than the COF 432 of the second water-based drilling fluid mixed with the first additive. The data demonstrates that the using a quantity (e.g., 7 cc) of the first additive in the second water-based drilling fluid will improve the lubricating effect of the resulting wellbore drilling fluid relative to using diesel or two different mineral oils in the second water-based drilling fluid. The use of the first additive can minimize or eliminate any environmental impact due to the additive's eco-friendly nature.

EXAMPLE 4

Comparing Lubricities of Different Wellbore Drilling Fluids

Three liters of a third water-based wellbore drilling fluid (KC1-Polymer) was prepared using a high speed mixture. 350 cc of the third water-based drilling fluid was mixed with 7 cc of the first additive produced by implementing process 300 described above, and mixed for five minutes using a high speed mixer. The lubricity coefficient of the third water-based drilling fluid without an additive and that of the third water-based drilling fluid mixed with the first additive were measured. The test was repeated using 350 cc of the third water-based drilling mud and diesel, using 350 cc of the third water-based drilling mud and a first mineral oil, and 350 cc of the third water-based drilling mud and a second mineral oil (SAFRA™). The COFs obtained by performing these experiments were compared with the COFs of oil-based wellbore drilling fluids and diesel-based wellbore drilling fluids.

Figure 4D:
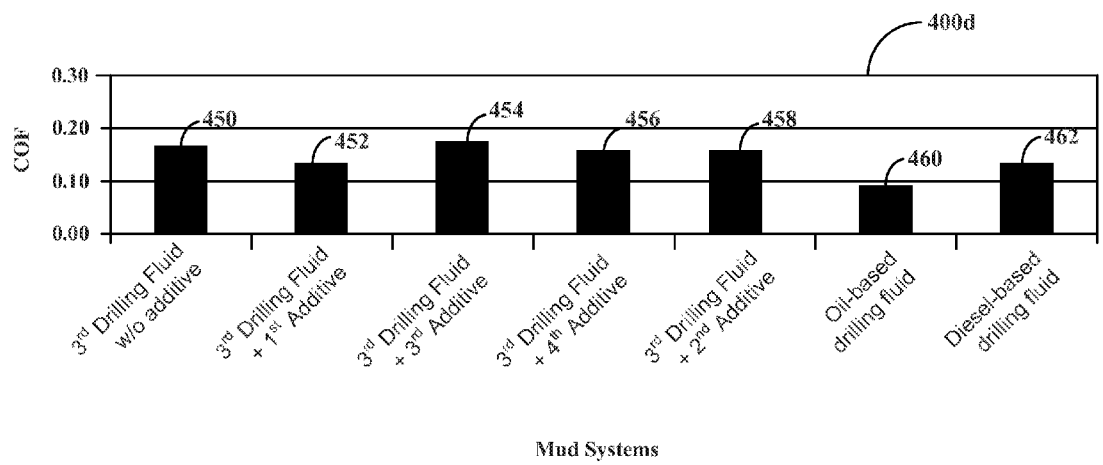

FIG. 4D is a bar chart 400d comparing COFs of the third water-based drilling fluid with different additives. As the bar chart 400d shows, the COF 450 of the third water-based drilling fluid without any additive is between 0.1 and 0.2. The COF 452 of the third water-based drilling fluid mixed with the first additive is less than the COF 450. The COF 454 of the third water-based drilling fluid mixed with diesel oil, the COF 456 of the third water-based drilling fluid mixed with the first mineral oil, and the COF 458 of the third water-based drilling fluid mixed with the second mineral oil (Safra™) are comparable to the COF 452 of the third water-based drilling fluid mixed with the first additive. The COF 460 of the oil-based drilling fluid and the COF 462 of the diesel-based drilling fluid are only marginally less than the COF 452 of the third water-based drilling fluid mixed with the first additive. The data demonstrates that the using a quantity (e.g., 7 cc) of the first additive in the third water-based drilling fluid will improve the lubricating effect of the resulting wellbore drilling fluid relative to using diesel or two different mineral oils in the third water-based drilling fluid. The use of the first additive can minimize or eliminate any environmental impact due to the additive's eco-friendly nature.

A number of implementations have been described. Nevertheless, it will be understood that various modifications may be made without departing from the spirit and scope of the disclosure.

The invention claimed is:

1. A method for producing water-based wellbore drilling fluids, the method comprising:
   esterifying a raw material oil comprising fatty acids with a short chain alcohol in the presence of a catalyst to produce alkyl ester products and triglycerides;
   washing the alkyl ester products;
   heating the alkyl ester products to remove any residual water or the short chain alcohol; and
   mixing a first quantity of the alkyl ester products with a second quantity of a water-based wellbore drilling fluid, wherein the first quantity is substantially between 1.5% and 3.4% by volume of a sum of the first quantity and the second quantity.

2. The method of claim 1, wherein the first quantity is substantially between 6 cc and 12 cc, and the second quantity is 350 cc.

3. The method of claim 1, further comprising separating the alkyl ester products and the triglycerides before washing the alkyl ester products.

4. The method of claim 1, further comprising removing impurities from the raw material oil prior to esterifying the raw material oil.

5. The method of claim 1, wherein removing the impurities from the raw material oil comprises filtering the raw material oil at a pressure ranging substantially between 5 psi and 10 psi.

6. The method of claim 1, wherein the raw material oil comprises processed vegetable oil.

7. The method of claim 1, wherein the fatty acids comprise molecules averaging substantially from 16 carbon atoms to less than 20 carbon atoms.

8. The method of claim 1, wherein the short chain alcohol comprises at least one or more of methanol, ethanol, propanol, or butanol.

9. The method of claim 1, wherein a plastic viscosity of the raw material oil is greater than substantially 50 cP.

10. The method of claim 1, wherein the catalyst comprises at least one of sodium hydroxide, potassium hydroxide, sodium alkoxides, or potassium alkoxides.

11. The method of claim 1, further comprising, before washing the alkyl ester products, breaking emulsions formed in the alkyl ester products and triglycerides in response to the esterifying.

12. The method of claim 11, breaking the emulsions formed in the alkyl ester products and triglycerides in response to the esterifying comprises adding a quantity of acetic acid to the alkyl ester products and triglycerides.

* * * * *